United States Patent
Preuss (10) Patent No.: US 7,143,015 B1
(45) Date of Patent: Nov. 28, 2006

(54) METHOD AND SYSTEM FOR RAPID IDENTIFICATION OF MULTIPLE INPUT SYSTEMS

(75) Inventor: Robert D. Preuss, Sagamore Beach, MA (US)

(73) Assignee: BBN Technologies Corp., Cambridge, MA (US)

( * ) Notice: Subject to any disclaimer, the term of this patent is extended or adjusted under 35 U.S.C. 154(b) by 754 days.

(21) Appl. No.: 10/289,765

(22) Filed: Nov. 7, 2002

(51) Int. Cl.
  *G06F 17/10* (2006.01)
(52) U.S. Cl. ............................ 703/2; 700/32
(58) Field of Classification Search ................ 703/2, 703/14, 17; 700/28, 29, 31, 34, 32
  See application file for complete search history.

(56) References Cited

U.S. PATENT DOCUMENTS 6,519,738 B1 * 2/2003 Derby .................. 714/781
6,532,256 B1 * 3/2003 Miller .................. 375/222
6,560,493 B1 * 5/2003 Dahleh et al. .......... 700/28
6,801,086 B1 * 10/2004 Chandrasekaran ...... 330/140

* cited by examiner

*Primary Examiner*—Albert W. Paladini
(74) *Attorney, Agent, or Firm*—Fish & Neave IP Group Ropes & Gray LLP (57) ABSTRACT

The disclosure describes techniques for determining the response characteristics of a system. One such technique includes applying a series of M vector probe input signal sets of a form $\overline{V}_m x(t)$ to the system, wherein $\overline{V}_m$ is an m-th column of a matrix V and x(t) is a scalar input signal. The response signals $\overline{y}_t$ are measured and a single-input system $\overline{F}_m(z)$ is determined by considering the approximate relationship $\overline{y}_z \approx \overline{F}_m(z)x(z)$, where $\overline{F}_m(z)$ is an m-th column of a matrix F(z). The system characteristics can be determined from the relationship $H(z)=F(z)V^{-1}$, where $V^{-1}$ denotes the right-matrix-inverse of the matrix V. The matrix V may be a matrix with mutually orthogonal rows, or may have entries consisting of plus one and minus one values, or may be a portion of a Hadamard matrix.

22 Claims, 4 Drawing Sheets

METHOD AND SYSTEM FOR RAPID IDENTIFICATION OF MULTIPLE INPUT SYSTEMS

REFERENCE TO GOVERNMENT FUNDING

The U.S. Government has a paid-up license in this invention and the right in limited circumstances to require the patent owner to license to others on reasonable terms as provided for by the terms of Contract No. N00024-91-C-4355 awarded by Naval Sea Systems Command.

FIELD OF THE INVENTION

The methods and systems relate to identifying system parameters, and more particularly to methods and systems for rapidly identifying parameters for multiple input systems.

BACKGROUND

Mathematical models of systems can be used in a wide variety of disciplines. These mathematical models can be used to predict how a system will react in different environments and can be used to improve the system. One approach to mathematical modeling may be known as "white box" modeling. In this approach, the laws governing a system are represented mathematically. For example, for a physical system, the law of gravity may be represented in the model. The outputs of the system may be determined by applying the mathematical model to the inputs. Sometimes, however, system behavior is too complex to be easily modeled using the "white box" approach.

Another approach to mathematical modeling may be known as system identification (SysId). System identification may include mathematical modeling of systems from experimental data and may be applied in many engineering areas, e.g., communications, mechanical engineering, or geophysical engineering for purposes such as spectral analysis, fault detection, adaptive filtering, linear prediction, and pattern recognition. SysId techniques may also find application in fields such as biology, environmental sciences and econometrics.

In SysId, a system can be treated as a black box, i.e., inputs can be applied to an unknown system, and a corresponding (noise corrupted) output signal from that system can be observed. These input and output signals may then be used, together with a mathematical model of the system, to estimate the model parameters that best characterize the system. When the system has N input channels, traditionally one may repeat the experiment N times with a different input channel selected to be active for each repetition.

SUMMARY OF THE INVENTION

A method, system and/or computer program disposed on a computer readable medium for determining characteristics of a system $H(z)$ having multiple inputs may comprise applying a series of M vector probe input signal sets of a form $\overline{V}_m x(t)$ to the system, wherein $\overline{V}_m$ is an m-th column of a matrix V and $x(t)$ is a scalar input signal, measuring response signals of the system, $\overline{y}_t$, determining a single-input system $\overline{F}_m(z)$, by considering the approximate relationship $\overline{y}_z \approx \overline{F}_m(z)x(z)$, where $\overline{F}_m(z)$ is an m-th column of a matrix $F(z)$ and determining the system characteristics from the relationship $H(z)=F(z)V^{-1}$, where $V^{-1}$ denotes the right-matrix-inverse of the matrix V. The matrix V may be a matrix with mutually orthogonal rows and may have entries consisting of plus one and minus one values.

The matrix V may be chosen as N rows of a Hadamard matrix with dimension M×M, where N is the number of multiple input signals of the system and $M \geq N$. M may be chosen as a whole number power of 2 such that the system characteristics may be determined using a Fast Hadamard Transformation. The single-input system may be determined by correlating the input signals with themselves and with the output signals to obtain a set of normal equations and then solving the set of normal equations. Various known methods may be used to solve the set of normal equations, such as, but not limited to, using a Cholesky decomposition method or a preconditioned conjugate gradient method.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
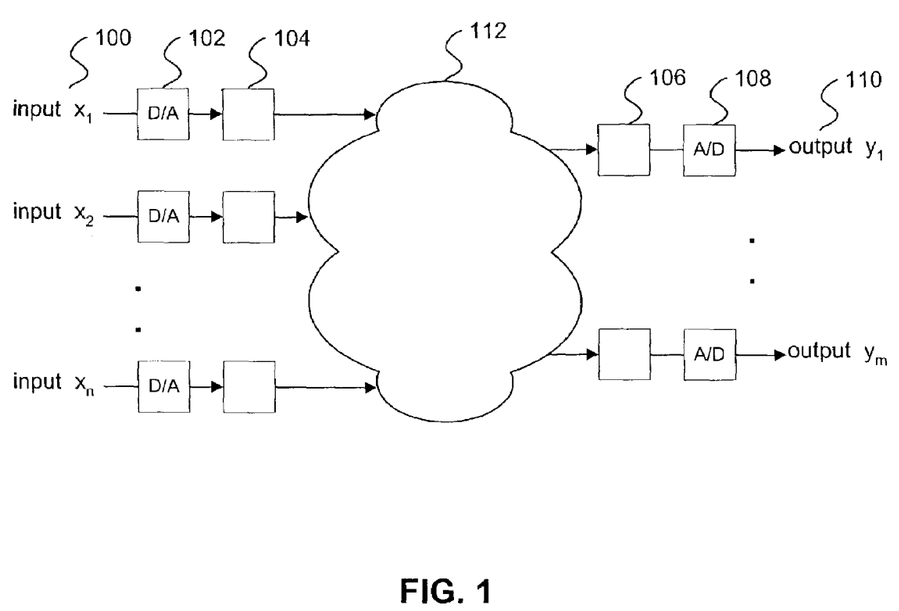
FIG. 1 shows a diagram illustrating inputs applied to a system and the resulting responses.

FIG. 1 depicts a system 112 having unknown characteristics. To determine the characteristics of the system 112, a collection of actuators 104 may operate on the system 112 in accordance with input signals 100 processed by digital-to-analog converters 102, where a series of input signal 100, converter 102 and actuator 104 can form an input channel to system 112. As an example, the system 112 may be a structure operated upon by a set of actuators, or shakers, 104 that may amplify a converted input signal 100 and shake the structure at an intensity commensurate to the input signal 100. Because the digital-to-analog converters 102 and actuators, or amplifiers, 104 have practical range limitations, the level of the input signal 100 may be limited so as to avoid signal distortion or damage to the converters 102, amplifiers 104, or other components.

FIG. 1 also depicts sensors 106 that may monitor the response of the system 112 to the input 100. To continue the example, these sensors 106 can detect the vibrational response of the structure, or system 112, to shakers 104. As shown, these sensors 106 can feed analog/digital converters 108 that can convert these responses to digital output signals 110.

By analyzing the system's 112 response 110 to a given set of inputs 100, a relationship can be established between a given input 100 and a given output 110. One method to determine such relationships may be to apply a zero input signal 100 to all but one of the actuators 104. That is, a single, scalar input signal 100 can be applied to one of the actuators 104 and zero input signals can be applied to the remaining actuators 104, and the responses 110 of the sensors 106 to the single non-zero input signal 100 can be measured. This process can be repeated until each of the different input signals 100 have been cycled through and applied. This traditional technique can take an NT amount of time to perform, where N can be the number of inputs to system 112 and T can be the duration over which an input signal 100 may be applied to the system 112. Further, this technique can apply a total of PNT units of energy to the system 112 over the duration NT, where P can be the amount of power imparted by the non-zero valued input.

An approach, or method can be described herein that applies non-zero input signals 100 to multiple actuators 104 simultaneously. Such input signals 100 can be considered a set of vector probe signals $\bar{x}_t$, wherein a vector probe signal $\bar{x}_t$ may be composed of N scalar signals $x_1, x_2, \ldots, x_N$. The application of sets of vector probe signals $\bar{x}_t$ can result in the application of a large amount of energy into system 112, that can increase the ratio between the output 110 and measurement noise (e.g., measurement error that an actuator 104 or sensor 106 may introduce) or some other source of noise, such as an external interference. For example, using M sets of vector probe signals $\bar{x}_t$ with N components of power P for T units of time may apply, over MT units of time, a total of MPNT units of energy into system 112, in comparison to the N scalar input signals 100, which may apply, over NT units of time, a total of PNT units of energy, as noted previously. That is, each component $(x_1, x_2, \ldots, x_N)$ of the vector probe signal $\bar{x}_t$ can impart the same amount of energy into system 112 as the single, scalar input single 100 applied at one of the actuators 104.

Thus, better measurements can be obtained due to the higher Signal to Noise Ratio (SNR). Alternatively, by reducing the vector probe duration to T/M from T units of time, a total of MPNT/M=PNT units of energy may be put into system 112 in MT/M=T units of time. Thus, the same measurement fidelity can be obtained in only T units of time when using M vector probe signals instead of NT units of time using the N scalar input signals.

In greater detail, the system's 112 response 110 to the inputs 100 can be compactly represented using z-transforms and vector notation according to:

$$\bar{y}_z = H(z)\bar{x}_z + \bar{u}_z. \tag{1}$$

Here $$\bar{y}_z = \sum_{t=-\infty}^{\infty} \bar{y}_t z^{-t} \tag{2}$$

is the z-transform of $\bar{y}_t$, and $\bar{y}_t$ is the known vector of output signals 110 at time t;

$$\bar{x}_z = \sum_{t=-\infty}^{\infty} \bar{x}_t z^{-t} \tag{3}$$

is the z-transform of $\bar{x}_t$, and $\bar{x}_t$ is the known vector of input signals 100 at time t; and $$\bar{u}_z = \sum_{t=-\infty}^{\infty} \bar{u}_t z^{-t} \tag{4}$$

is the z-transform of $\bar{u}_t$, and $\bar{u}_t$ is an unknown vector of noise signals introduced by the measurement process, external interference, and/or other factors.

In Equation [1], H(z) is a transfer matrix which represents a mathematical model of the contribution of a vector of input signals, $\bar{x}_t$, to a vector of output signals, $\bar{y}_t$. The embodiments described hereafter may provide methods to estimate the parameters of H(z) from the known vector of input signals $\bar{x}_t$ and the known vector of output signals $\bar{y}_t$. In some cases, the mathematical model will be chosen to be that of a finite impulse response (FIR) dynamic system with response duration K, i.e., $$H(z) = \sum_{k=0}^{K-1} H_k z^{-k}. \tag{5}$$

Here $H_k$ represents the k-th matrix of parameters to be estimated, for $k=0, 1, \ldots, K-1$.

Vector probes obtained from M fixed direction vectors, each with N components, may be considered. The fixed direction vectors can form the columns of an N×M real valued matrix, V, such that $\bar{V}_m$ is the m-th column of V. The vector of input signals, $\bar{x}_t$, can be expressed as the multiplication of a vector $\bar{V}_m$ by the scalar signal x(t):

$$\bar{x}_t = \bar{V}_m x(t) \tag{6}$$

where M is a number of sets of inputs applied to the system 112 and m is the m-th set of inputs within the M sets.

Substituting Equation [6] into Equation [1] yields:

$$\bar{y}_z = \bar{F}_m(z)x(z) + \bar{u}_z. \tag{7}$$

where $$x(z) = \sum_{t=-\infty}^{\infty} x(t)z^{-t} \tag{8}$$

is the z-transform of the scalar signal x(t) and $$\bar{F}_m(z) = H(z)\bar{V}_m. \tag{9}$$

The known input signals 100 and output signals 110 can allow measurement of the single-input system $\bar{F}_m(z)$. Measurement of the single-input system $\bar{F}_m(z)$ can be accomplished by methods used by those of skill in the art when applying x(t) to the n-th input of H(z), while holding the other inputs at zero, to measure $\bar{H}_n(z)$. For example, one may consider the difference $\bar{y}_z - \bar{F}_m(z)x(z)$ and use the known method of least squares to obtain $\bar{F}_m(z)$. For example, if H(z) is a Finite Impulse Response (FIR) system, as provided in Equation [5], and if the system 112 is supposed to have R output signals then the r-th component of $\bar{F}_m(z)$ can be a FIR system with scalar coefficients $f_{r,m,k}$ and the coefficient of $z^{-t}$ for the r-th component of the difference $\bar{y}_z - \bar{F}_m(z)x(z)$ may be equated to $e_t$ to yield an overdetermined linear system of equations:

$$e_t = y_r(t) - \sum_{k=0}^{K-1} f_{r,m,k} x(t-k), \tag{10}$$

where $y_r(t)$ is the r-th component of $\bar{y}_t$. Then the least squares method can be used to obtain the coefficients $f_{r,m,k}$ for k=0, 1, . . . , K−1 that minimize $$\sum_{t=0}^{T-1} e_t^2$$

when the vector probe is applied for T units of time or, in an alternative, $$\sum_{t=0}^{(T/M)-1} e_t^2$$

when the vector probe is applied for only T/M units of time.

As may be well known by those skilled in the art, there can be many methods for solving such least squares minimization problems. One such method that can be used includes first forming a set of normal equations by correlating the signal x(t) with itself and with $y_r(t)$. Then, to obtain the coefficients $f_{r,m,k}$ for k=0, 1, . . . , K−1, one can solve these normal equations by any one of a variety of methods such as the Cholesky decomposition method or the preconditioned conjugate gradient (PCG) method. Repeating for r=0, 1, . . . , R−1 yields all the coefficients of $\bar{F}_m(z)$. Then, repeating for m=0, 1, 2, . . . , M−1, and placing $\bar{F}_m(z)$ in the m-th column of a matrix F(z), the matrix system F(z)=H(z)·V can be measured. To recover H(z), one can compute $$H(z)=F(z)V^{-1} \qquad [11]$$

where $V^{-1}$ is the right-matrix-inverse of the matrix V. Thus, H(z) may be expressed as a function of measurable values, i.e., the matrix F(z) and the right-matrix-inverse of the matrix V. It can be understood that in order to use the right-matrix-inverse of V, V can be chosen to be a matrix of rank N with M≧N columns.

The above can provide an approach requiring very little additional computation over the traditional approach previously identified. Identifying the columns of $\bar{F}_m(z)$ may generally require less computational effort than if one used a scalar probe to measure the column $\bar{H}_n(z)$ of H(z). This is especially true when each vector probe signal is applied for a duration of T/M units of time to identify a column $\bar{F}_m(z)$ while, for the same overall measurement fidelity, the scalar probe used to identify a column $\bar{H}_n(z)$ is applied for a duration of T units of time. The additional computation that may be required in multiplying F(z) by $V^{-1}$ can be seen to be trivial in this context. Thus, the advantages noted previously for the M vector probe signals as compared to the N scalar input signals may be realized without additional computation cost and, in some cases, with lower overall computational cost.

The choice for the matrix V may depend on the particular system 112 under analysis and the characteristics being determined. For example, if V=W, where W is a real scalar multiple of an N×M matrix with orthonormal rows, and if the same scalar signal x(t) is used to generate each of the vector probes in Equation [6] for m=0, 1, . . . , M−1, then the energy will be distributed equally in different directions. This can be seen by supposing that $\bar{q}$ can be any vector direction with N components and unit length so that $\bar{q}^T\bar{q}=1$.

As will be understood by one skilled in the art, the symbol $\bar{q}^T$ indicates the transpose of the column vector $\bar{q}$. Then, if PT is the energy in the scalar signal x(t), the total energy applied in direction $\bar{q}$ by the vector probes can be $$E(\bar{q}) = \sum_{m=0}^{M-1} (\bar{q}^T \bar{V}_m)^2 PT = \bar{q}^T \sum_{m=0}^{M-1} \bar{V}_m \bar{V}_m^T \bar{q} PT. \qquad [12]$$

Now, since V=W and W is a real scalar multiple, say α, of an N×M matrix with orthonormal rows $$\sum_{m=0}^{M-1} \bar{V}_m \bar{V}_m^T = WW^T = \alpha^2 I \qquad [13]$$

where I is the N×N identity matrix. Consequently, since $\bar{q}$ has unit length, the total energy applied in direction $\bar{q}$ is $$E(\bar{q})=\alpha^2 PT \qquad [14]$$

regardless of what direction $\bar{q}$ has been selected.

The matrix V can also be chosen to direct an amount of energy determined by $\lambda_n$ into N orthonormal directions $\bar{q}_n$ for n=0, 1, . . . , N−1. To do so, one may define an N×N diagonal matrix L whose n-th diagonal entry is $\lambda_n$ and an N×N orthogonal matrix Q whose n-th column is $\bar{q}_n$ and choose V=QLW. Now the energy directed in the direction $\bar{q}_n$ can be given by:

$$E(\bar{q}_n) = \qquad [15]$$
$$\bar{q}_n^T \sum_{m=0}^{M-1} \bar{V}_m \bar{V}_m^T \bar{q}_n PT = \bar{q}_n^T QL \sum_{m=0}^{M-1} \bar{W}_m \bar{W}_m^T L Q^T \bar{q}_n PT = \lambda_n^2 \alpha^2 PT$$

so that this amount of energy is determined by the chosen value $\lambda_n$ as desired. As will be understood by one skilled in the art, the construction V=QLW is effectively a singular value decomposition of V wherein the orthonormal direction vectors $\bar{q}_n$ are effectively the left singular vectors of V and the corresponding values $\lambda_n$ are effectively the singular values of V. As will also be understood by one skilled in the art, the scalar input signal x(t) may be chosen to preferentially put different amounts of energy in different frequency regions or it may be chosen to be 'white' so that an equal amount of energy is applied in different frequency regions. In Equation [6], the scalar signals x(t) used with different columns of V can differ in duration, T (or T/M), as well as, for example, in terms of the amount of energy contained within different frequency regions. In other words, scalar signals x(t) varying by shape as well as duration may be employed with different columns of V when practicing embodiments of the invention.

V may also be chosen to maximize the amount of energy applied to the system 112. If the scalar input signal x(t) can be taken as having the maximum energy that may be input into any one of the channels of system 112, it can be seen that inputting x(t) or −x(t) into each of the channels may maximize the total energy input into system 112. Thus, by choosing the columns of V to consist of plus one values or minus one values (+1 or −1), the maximum energy may be input to the channels when the multiplication operation denoted by Equation [6] is performed. It can be understood that, for some systems 112, it may be desirable to vary the energy inputs to the channels such that V may consist of values in addition to plus ones and minus ones.

However, for those systems where both equal amounts of energy applied in different frequency regions and maximum energy input may be desired, V may form N rows of an M×M Hadamard matrix, i.e., a non-singular, orthogonal matrix having only +1 and −1 values. An example of a 2×2 Hadamard matrix may include values of:

$$\begin{bmatrix} 1 & 1 \\ 1 & -1 \end{bmatrix}. \quad [16]$$

A Hadamard matrix can be recursively defined such that a 4×4 Hadamard matrix, for example, may include values of:

$$\begin{bmatrix} \begin{bmatrix} 1 & 1 \\ 1 & -1 \end{bmatrix} & \begin{bmatrix} 1 & 1 \\ 1 & -1 \end{bmatrix} \\ \begin{bmatrix} 1 & 1 \\ 1 & -1 \end{bmatrix} & -\begin{bmatrix} 1 & 1 \\ 1 & -1 \end{bmatrix} \end{bmatrix}. \quad [17]$$

As may be known, Hadamard matrices may be of certain discrete sizes, e.g., the Hadamard matrices of dimension less than 100 may include only those with dimensions of 2×2, 4×4, 8×8, 12×12, 16×16, 20×20, 24×24, 28×28, 32×32, 36×36, 40×40, 44×44, 48×48, 52×52, 56×56, 60×60, 64×64, 68×68, 72×72, 76×76, 80×80, 84×84, 88×88, 92×92, and 96×96.

If a system 112 has, for example, N=27 input channels one may observe that there is no Hadamard matrix of dimension 27×27. In this situation, V may be chosen as the first N=27 rows of a larger, say 32×32, Hadamard matrix with the number of columns of V set to M=32. Alternatively, for this twenty-seven input example, V may be chosen as the first N=27 rows of a 28×28 Hadamard matrix with the number of columns of V set to M=28. Regardless of whether V is chosen to be a portion of a 32×32 Hadamard matrix or a 28×28 Hadamard matrix, the use of vector probes based on this choice for V can apply the maximum energy input to the system 112 with an equal amount of energy being applied in any direction.

In choosing the dimension for the Hadamard matrix to be used, it may be noted that, for Hadamard matrices formed by tensor products, e.g., matrices recursively defined from the 2×2 Hadamard matrix shown at Equation [16], the use of a technique well-known in the art as the Fast Hadamard Transform (FHT) can speed operations with Hadamard matrices such that the computational cost of applying the right-matrix-inverse in accordance with Equation [11] may be lessened.

Thus for the example twenty-seven input system 112, the 32×32 ($2^5 \times 2^5$) Hadamard matrix may be chosen such that V can be a 27×32 partition of the Hadamard matrix. As provided above, the energy spread may be equal in different directions. The plus ones and minus ones of the Hadamard matrix can provide for maximum energy input to the channels and the $2^5 \times 2^5$ dimension can allow for the use of the FHT technique.

Figure 2:
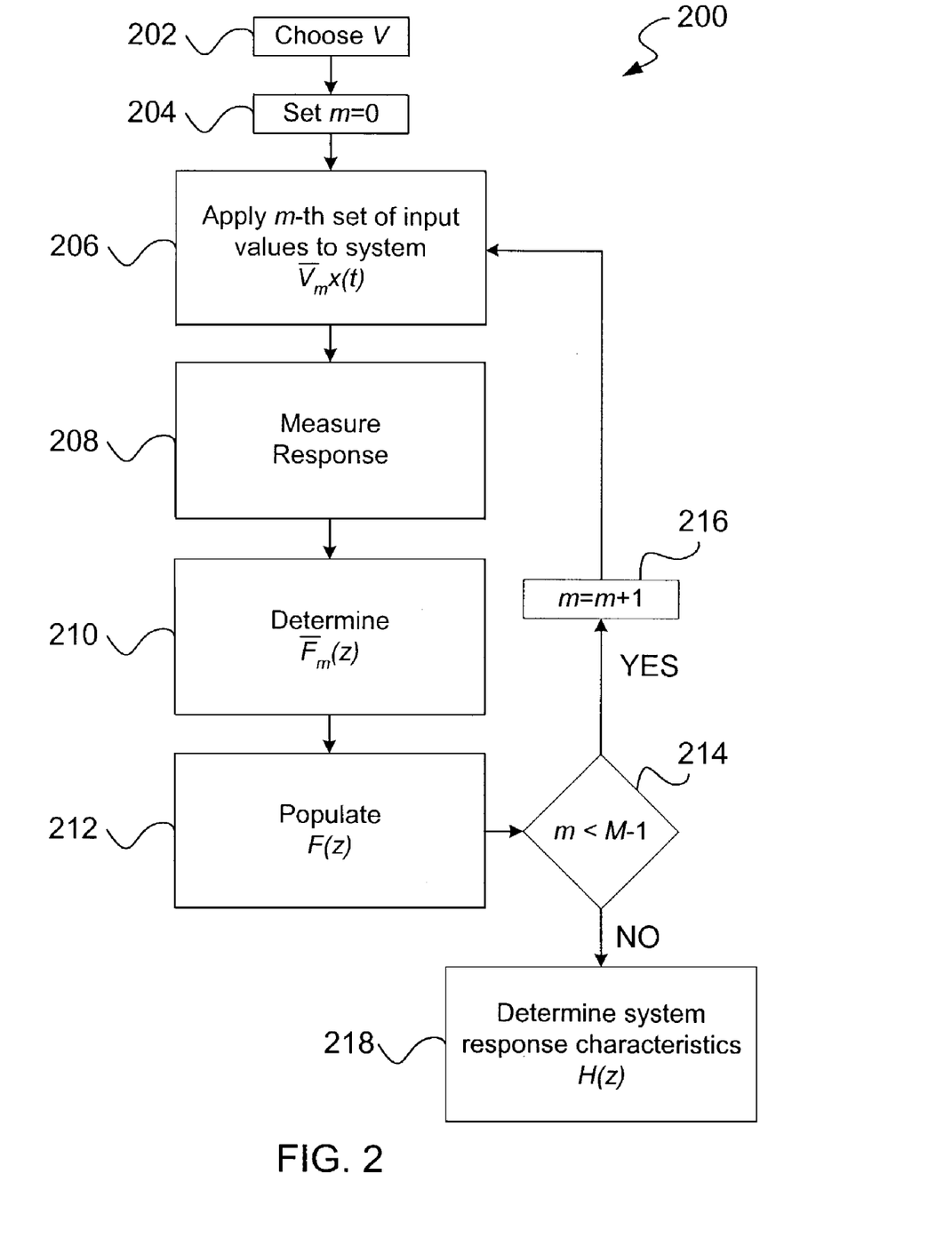
FIG. 2 shows a flowchart for determining the response characteristics of a system.

FIG. 2 can illustrate a process 200 for determining system response characteristics using the approach described above. A matrix V is first chosen (202) such that the process 200 may apply a series of M vector probe signals to the system in accordance with Equation [6]. At 204, m is first set to 0. The m-th set of vector probes may then be applied (206). For each vector probe m, the system responses may be measured (208) and the least squares procedure may be used to determine $\overline{F}_m(z)$ (210), as shown at Equations [7], [8], and [9] and $\overline{F}_m(Z)$ may be used to populate the matrix F(z), by placing F(z) in the m-th column of F(z) (212). If m<M−1 (214), then m may be incremented (216) and process 200 may return to 206. When F(z) is fully populated, i.e., when the m=M−1, F(z) may be multiplied by the right-matrix-inverse of V (218) to determine the characteristics of the system H(z), as shown at Equation [11].

Figure 3:
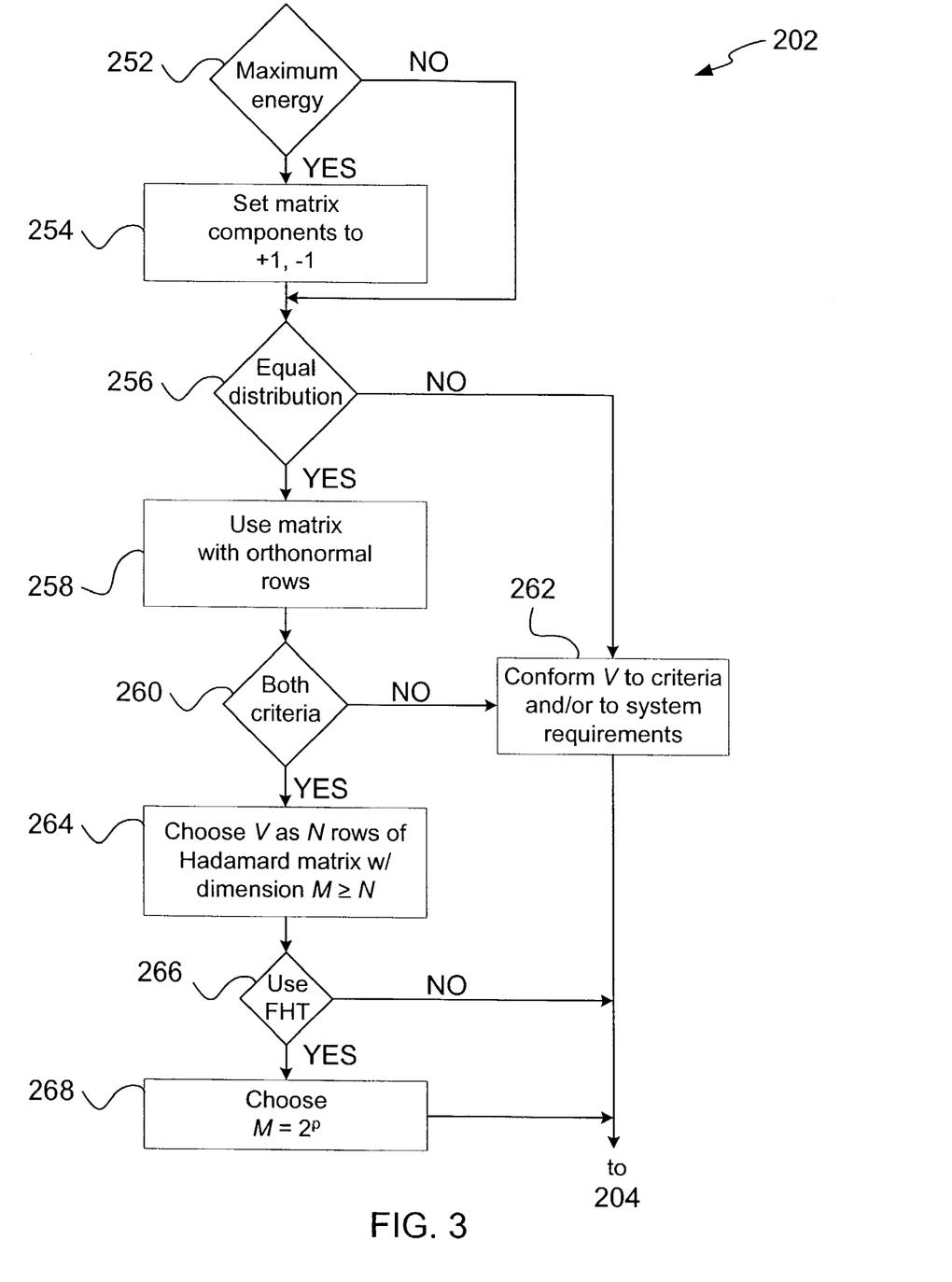
FIG. 3 shows a flowchart for choosing a matrix used in the process of FIG. 2.

FIG. 3 can illustrate the process 202 for choosing the matrix V. A decision may first be made (252) as to whether it is desired to input the maximum amount of energy into system 112. If yes, plus ones and minus ones may be used as the components of matrix V (254). It may then be decided (256) if an equal energy distribution may be desired. If yes, the matrix V may be configured with mutually orthonormal rows (258). If it is determined (260) that both the maximum energy criteria and the equal energy distribution criteria may be desired, V may be a portion of a Hadamard matrix (264). If neither criteria may be desired, or only one of the above criteria may be desired, as determined at 260, then the matrix V may be chosen to meet the desired criteria as determined from 252 and 256 and/or other system requirements, as indicated at 262.

When V may be a portion of a Hadamard matrix, it may be found that a Hadamard matrix conforming in size to the number of system 112 inputs N may not exist. A Hadamard matrix of size M×M may be chosen, where M≧N, and V may be chosen as N rows of the M×M Hadamard matrix (264). When the Fast Hadamard Transform (FHT) technique may be used, as determined at 266, then M may be taken as $2^p$, where p is a whole number, and V may be chosen as an N×M partition of the $2^p \times 2^p$ Hadamard matrix (268).

Figure 4:
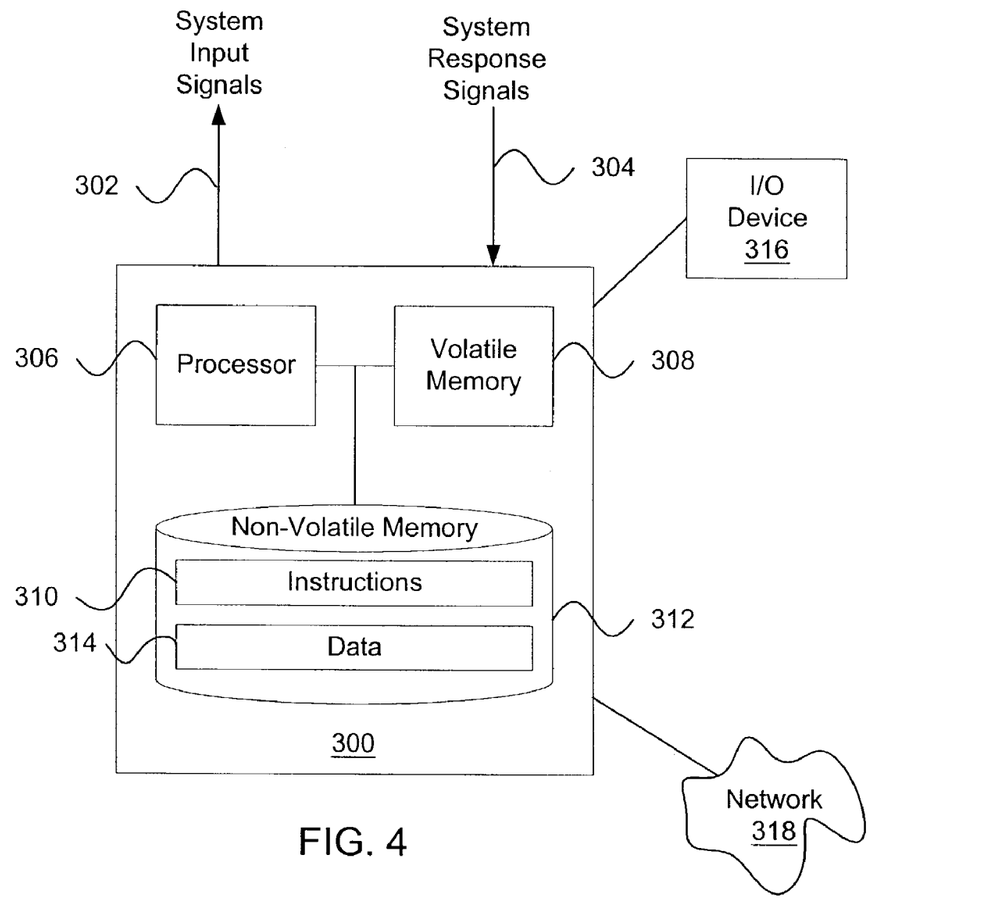
FIG. 4 shows a diagram of a computer platform suitable for determining response characteristics of a system.

The process 200 of FIG. 2, including the process 202 of FIG. 3, may be implemented by a processor controlled device 300. FIG. 4 illustrates a device 300 suitable for executing instructions 310 implementing techniques described above. The device 300 includes a processor 306, volatile memory 308, and non-volatile memory 312. The memory 308, 312 may store data 314 corresponding to the input and output values, the matrix V and its inverse, and the resulting data for H(z).

The memory 312 may also include instructions 310. The instructions 310 can be transferred, in the course of operation, from the non-volatile memory 312 to the volatile memory 308 and processor 306 for execution. The instructions 310 may output system input values, as indicated at 302, and receive system output values, as indicated at 304, during system testing. The device 300 may communicate with a user via a monitor or other input/output device 316 such as a keyboard, mouse, microphone, and so forth. Additionally, the device 300 may feature a network connection 318.

The techniques described herein may not be limited to a particular hardware or software configuration; they may find applicability in many computing or processing environments. The techniques may be implemented in hardware or software, or a combination thereof. Preferably, the techniques are implemented in computer programs.

The computer programs may be implemented in high level procedural language (e.g., MATLAB®, The MathWorks, Inc., Natick, Mass.) or an object oriented programming language to communicate with a computer system.

However, the programs can be implemented in assembly or machine language, if desired. In any case the language may be compiled or interpreted language.

The computer programs can be stored on a storage media or device(s) (e.g., CD-ROM, hard disk, or magnetic disk) that are readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Additionally, while described in conjunction with an example of a shaken physical structure, the approaches described may be applied to a wide variety of systems such as biological, signal processing, and so forth. Other embodiments are within the scope of the following claims.

What is claimed is:

1. A method of determining characteristics of a system H(z) having multiple inputs, the method comprising:
    applying to the system a series of vector probe input signal sets, each vector probe input signal set being formed using a column of a matrix V and a scalar input signal;
    measuring a response signal of the system;
    determining a single-input system $\overline{F}_m(z)$ by considering an approximate relationship where a z-transform of the scalar input signal applied to the single-input system yields a z-transform of the response signal of the system;
    determining a multiple-input system F(z) as the system whose m-th column is the determined single-input system $\overline{F}_m(z)$;
    obtaining a right-matrix-inverse of the matrix V; and
    multiplying the multiple-input system F(z) by the right-matrix-inverse of the matrix V to determine the characteristics of the system H(z).

2. The method of claim 1, comprising choosing rows of the matrix V to be mutually orthogonal.

3. The method of claim 1, comprising choosing entries in the matrix V to consist of plus one and minus one values.

4. The method of claim 3, comprising choosing rows of the matrix V to be mutually orthogonal.

5. The method of claim 4, wherein choosing the matrix V comprises choosing the matrix V as N rows of a Hadamard matrix with dimension M×M, where N is the number of multiple input signals of the system and M≧N.

6. The method of claim 5, wherein choosing the matrix V comprises choosing M as a whole number power of 2.

7. The method of claim 6, wherein determining the system characteristics comprises using a Fast Hadamard Transformation.

8. The method of claim 6, wherein determining the single-input system comprises:
    correlating the input signals with themselves and with the output signals to obtain a set of normal equations; and
    solving the set of normal equations.

9. The method of claim 8, wherein solving comprises using a technique taken from a list of techniques comprising a Cholesky decomposition method and a preconditioned conjugate gradient method.

10. The system of claim 9, wherein determining the system characteristics comprises using a Fast Hadamard Transformation.

11. The system of claim 1, wherein determining the system characteristics comprises using a Fast Hadamard Transformation.

12. The method of claim 1, wherein determining the single-input system comprises:
    correlating the input signals with themselves and with the output signals to obtain a set of normal equations; and
    solving the set of normal equations.

13. The method of claim 12, wherein solving comprises using a technique taken from a list of techniques comprising a Cholesky decomposition method and a preconditioned conjugate gradient method.

14. A computer program, disposed on a computer readable medium, for determining characteristics of a system H(z) having multiple inputs, the computer program including instructions for causing a processor to:
    apply to the system a series of vector probe input signal sets, each vector probe input signal set being formed using a column of a matrix V and a scalar input signal;
    measure a response signal of the system;
    determine a single-input system $\overline{F}_m(z)$ by considering an approximate relationship where a z-transform of the scalar input signal applied to the single-input system yields a z-transform of the response signal of the system;
    determine a multiple-input system F(z) as the system whose m-th column is the determined single-input system $\overline{F}_m(z)$;
    obtain a right-matrix-inverse of the matrix V; and
    multiply the multiple-input system F(z) by the right-matrix-inverse of the matrix V to determine the characteristics of the system H(z).

15. The computer program of claim 14, wherein the computer program includes instructions for causing the processor to choose entries in the matrix V to consist of plus one and minus one values.

16. The computer program of claim 15, wherein the computer program includes instructions for causing the processor to choose rows of the matrix V to be mutually orthogonal.

17. The computer program of claim 16, wherein the computer program includes instructions for causing the processor to choose the matrix V as N rows of a Hadamard matrix with dimension M×M, where N is the number of multiple input signals of the system and M≧N.

18. The computer program of claim 17, wherein the computer program includes instructions for causing the processor to choose M as a whole number power of 2.

19. The computer program of claim 18, wherein the computer program includes instructions for causing the processor to determine the system characteristics using a Fast Hadamard Transformation.

20. The computer program of claim 19, wherein the computer program includes instructions for causing the processor to:
    correlate the input signals with themselves and with the output signals to obtain a set of normal equations; and
    solve the set of normal equations.

21. The computer program of claim 20, wherein the computer program includes instructions for causing the processor to use a technique for solving the set of normal equations taken from a list of techniques comprising a Cholesky decomposition method and a preconditioned conjugate gradient method.

22. A system for determining characteristics of a multiple input system H(z), the system comprising:

means for applying to the system a series of vector probe input signal sets, each vector probe input signal set being formed using a column of a matrix V and a scalar input signal;

means for measuring a response signal of the system;

means for determining a single-input system $\overline{F}_m(z)$ by considering an approximate relationship where a z-transform of the scalar input signal applied to the single-input system yields a z-transform of the response signal of the system;

means for determining a multiple-input system F(z) as the system whose m-th column is the determined single-input system $\overline{F}_m(z)$;

means for obtaining a right-matrix-inverse of the matrix V; and means for multiplying the multiple-input system F(z) by the right-matrix-inverse of the matrix V to determine the characteristics of the system H(z).

* * * * *